United States Patent
Pletka et al.

(10) Patent No.: US 11,023,150 B2
(45) Date of Patent: Jun. 1, 2021

(54) BLOCK MODE TOGGLING USING HYBRID CONTROLLERS

(71) Applicant: International Business Machines Corporation, Armonk, NY (US)

(72) Inventors: Roman Alexander Pletka, Uster (CH); Aaron Daniel Fry, Richmond, TX (US); Timothy Fisher, Cypress, TX (US); Sasa Tomic, Kilchberg (CH); Nikolaos Papandreou, Thalwil (CH); Nikolas Ioannou, Zurich (CH); Radu Ioan Stoica, Zurich (CH); Charalampos Pozidis, Thalwil (CH); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/459,408

(22) Filed: Jul. 1, 2019

(65) Prior Publication Data

US 2021/0004159 A1    Jan. 7, 2021

(51) Int. Cl.
*G06F 3/06* (2006.01)
*G06F 12/02* (2006.01)

(52) U.S. Cl.
CPC .......... *G06F 3/064* (2013.01); *G06F 3/0614* (2013.01); *G06F 3/0643* (2013.01);
(Continued)

(58) Field of Classification Search
CPC .. G06F 12/0246; G06F 3/0679; G06F 3/0643; G06F 3/0644; G06F 3/064; G06F 3/0614
(Continued)

(56) References Cited

U.S. PATENT DOCUMENTS

| 7,865,658 | B2 | 1/2011 | Lasser et al. |
| 7,948,798 | B1 | 5/2011 | Sheredy et al. |

(Continued)

FOREIGN PATENT DOCUMENTS

WO    2016069031 A1    5/2016

OTHER PUBLICATIONS

Li et al., "A New Hybrid SSD Architecture based on SLC and MLC," Applied Mechanics and Materials, vol. 541-542, Mar. 12, 2014, pp. 474-477.

(Continued)

*Primary Examiner* — Hua J Song
(74) *Attorney, Agent, or Firm* — Zilka-Kotab, P.C.

(57) ABSTRACT

A computer-implemented method, according to one embodiment, includes: maintaining a block switching metric for each block of memory in the storage system. A determination is made as to whether a first block in a first pool should be transferred to a second pool according to a block switching metric which corresponds to the first block. In response to determining that the first block in the first pool should be transferred to the second pool according to the block switching metric which corresponds to the first block, the first block is erased. The first block is then transferred from the first pool to a second RTU queue which corresponds to the second pool. A second block in the second pool is also erased and transferred from the second pool to a first RTU queue which corresponds to the first pool.

20 Claims, 11 Drawing Sheets

(52) U.S. Cl.
CPC .......... *G06F 3/0644* (2013.01); *G06F 3/0679* (2013.01); *G06F 12/0246* (2013.01)

(58) Field of Classification Search
USPC ........................................................ 711/100
See application file for complete search history.

(56) References Cited

U.S. PATENT DOCUMENTS

| | | | |
|---|---|---|---|
| 8,312,219 | B2 | 11/2012 | Cher et al. |
| 8,407,400 | B2 | 3/2013 | Marotta et al. |
| 8,943,261 | B2 | 1/2015 | Koradhanyamath et al. |
| 9,176,862 | B2 | 11/2015 | Chen et al. |
| 9,547,589 | B2 | 1/2017 | Yu et al. |
| 9,558,107 | B2 | 1/2017 | Camp et al. |
| 2010/0172179 | A1 | 7/2010 | Gorobets et al. |
| 2017/0123972 | A1* | 5/2017 | Gopinath ............ G06F 12/0253 |
| 2019/0065080 | A1 | 2/2019 | Tanpairoj et al. |

OTHER PUBLICATIONS

Gudeta et al., "Probability-Based Static Wear-Leveling Algorithm for Block and Hybrid-Mapping NAND Fash Memory," Design Automation for Embedded Systems, Issue 16, 2012, pp. 241-264.

Jimenez et al., "Libra: Software-Controlled Cell Bit-Density to Balance Wear in NAND Flash," ACM Transactions on Embedded Computing Systems, vol. 14, No. 2, Article 28, Feb. 2015, pp. 28:1-28:22.

Kim et al, "CRIM: Conditional Remapping to Improve the Reliability of Solid-State Drives with Minimizing Lifetime Loss," Scientific Programming, vol. 2018, Article ID 8171096, Sep. 20, 2018, pp. 1-10.

Pletka et al,"Designing Enterprise Controllers with QLC 3D NAND," Powerpoint Presentation from Flash Memory Summit, 2018, pp. 1-13.

Chang, L., "A Hybrid Approach to NAND-Flash-Based Solid-State Disks," IEEE Transactions on Computers, vol. 59, No. 10, Oct. 2010, pp. 1337-1349.

Glen, D., "Optimized Client Computing With Dynamic Write Acceleration," Micron, 2014, pp. 1-5.

Vatto, K., "Samsung SSD 850 EVO (120GB, 250GB, 500GB & 1TB) Review," Anandtech, Dec. 8, 2014, 6 pages, retrieved from https://www.anandtech.com/show/8747/samsung-ssd-850-evo-review/2.

Pletka et al., "Health-Binning: Maximizing the Performance and the Endurance of Consumer-Level NAND Flash," ACM, SYSTOR '16, Jun. 6-8, 2016, 10 pages.

Im et al., "ComboFTL: Improving performance and lifespan of MLC flash memory using SLC flash buffer ," Journal of Systems Architecture, Issue 56, 2010, pp. 641-653.

Pletka et al., U.S. Appl. No. 16/459,393, filed Jul. 1, 2019.

U.S. Appl. No. 16/439,122, filed Jun. 12, 2019.

Pletka et al., "Management of Next-Generation NAND Flash to Achieve Enterprise-Level Endurance and Latency Targets," ACM Transactions on Storage, vol. 14, No. 4, Article 33, Dec. 2018, pp. 33:1-33:25.

Yim, K., "A Novel Memory Hierarchy for Flash Memory Based Storage Systems," Journal of Semiconductor Technology and Science, vol. 5, No. 4, Dec. 2005, pp. 262-269.

Yang et al., "Utilization-Aware Self-Tuning Design for TLC Flash Storage Devices," IEEE Transactions on Very Large Scale Integration (VLSI) Systems, vol. 24, No. 10, Oct. 2016, pp. 3132-3144.

Park et al., "A hybrid flash translation layer design for SLC-MLC flash memory based multibank solid state disk," Microprocessors and Microsystems, Issue 35, 2011, pp. 48-59.

Anonymous, "A System and Method for Determining how to Optimally Pre-Stage Emergency and Service Vehicles," IP.com Prior Art Database, Technical Disclosure No. IPCOM000257321D, Jan. 31, 2019, 3 pages.

International Search Report and Written Opinion from PCT Application No. PCT/IB2020/055914, dated Sep. 29, 2020.

* cited by examiner

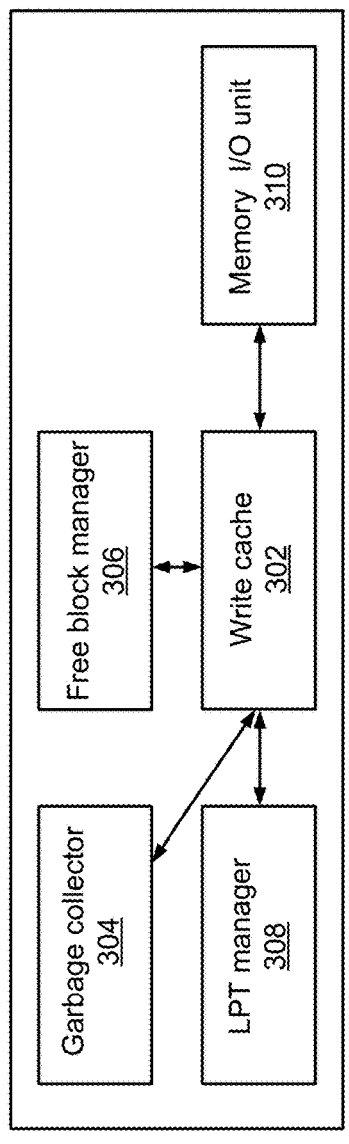
FIG. 3
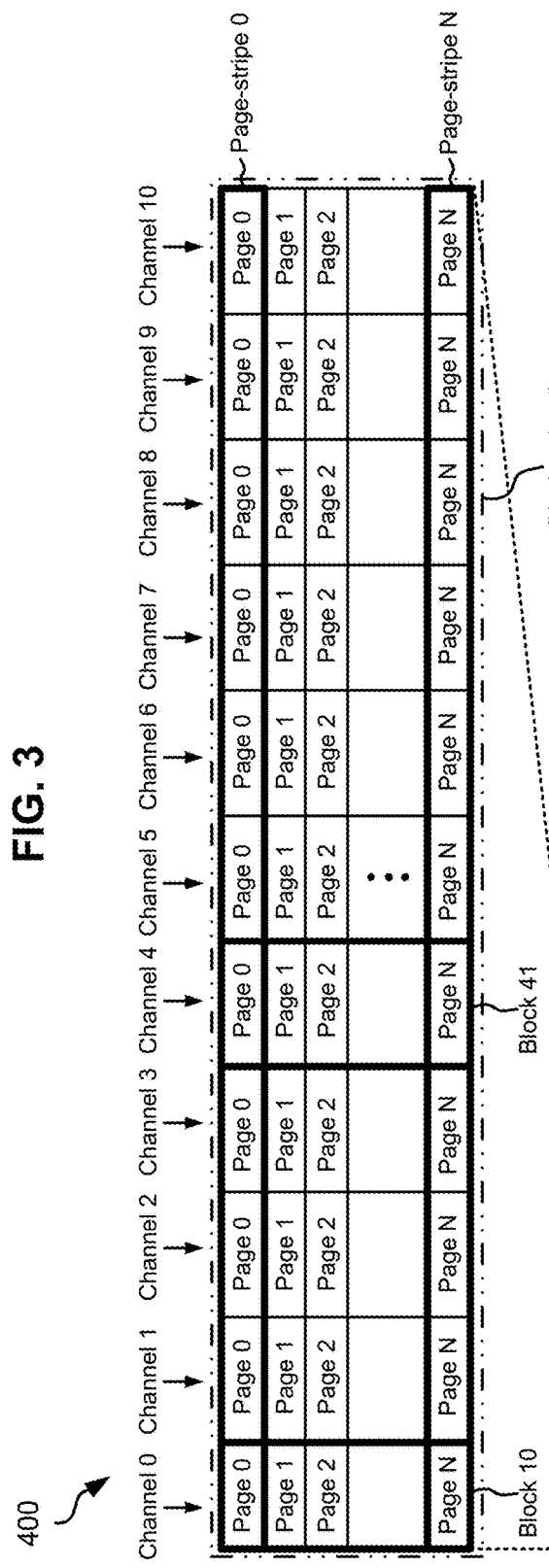
FIG. 4
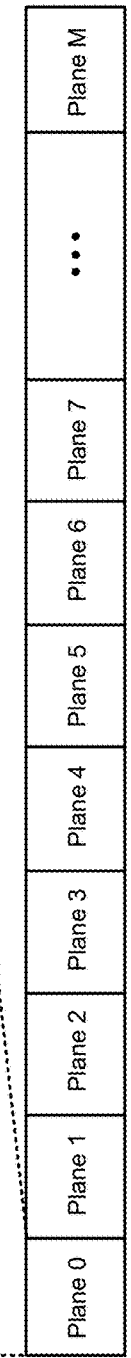

BLOCK MODE TOGGLING USING HYBRID CONTROLLERS

BACKGROUND

The present invention relates to data storage systems, and more particularly, this invention relates to block mode toggling using hybrid controllers.

Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

However, in Flash-based SSDs, memory locations are erased in blocks prior to being written to. The size of an erase block unit is anywhere from 256, to 512, or even several thousands of pages and the erase operations takes approximately one order of magnitude more time than a page program operation. Due to the intrinsic properties of NAND Flash, Flash-based SSDs write data out-of-place whereby a mapping table maps logical addresses of the written data to physical ones. This mapping table is typically referred to as the Logical-to-Physical Table (LPT).

As Flash-based memory cells exhibit read errors and/or failures due to wear or other reasons, additional redundancy may be used within memory pages as well as across memory chips (e.g., RAID-5 and RAID-6 like schemes). The additional redundancy within memory pages may include error correction code (ECC) which, for example, may include BCH, LDPC, or other codes. While the addition of ECC in pages is relatively straightforward, the organization of memory blocks into RAID-like stripes is more complex. For instance, individual blocks are retired over time which requires either reorganization of the stripes, or capacity reduction of the stripe. As the organization of stripes together with the LPT defines the placement of data, SSDs typically utilize a Log-Structured Array (LSA) architecture, which combines these two methods.

The LSA architecture relies on out-of-place writes. In this approach, a memory page overwrite will result in writing the memory page data to a new location in memory, marking the old copy of the memory page data as invalid, and then updating the mapping information. Due to the limitations of current NAND memory technology, an invalidated data location cannot be reused until the entire block it belongs to has been erased. Before erasing, though, the block undergoes garbage collection, whereby any valid data in the block is relocated to a new block. Garbage collection of a block is typically deferred for as long as possible to maximize the amount of invalidated data in block, and thus reduce the number of valid pages that are relocated, as relocating data causes additional write operations, and thereby increases write amplification.

SUMMARY

A computer-implemented method, according to one embodiment, is used to toggle block modes in a storage system. The computer-implemented method includes: maintaining a block switching metric for each block of memory in the storage system. A determination is made as to whether a first block in a first pool should be transferred to a second pool according to a block switching metric which corresponds to the first block. In response to determining that the first block in the first pool should be transferred to the second pool according to the block switching metric which corresponds to the first block, the first block is erased. The first block is then transferred from the first pool to a second ready-to-use (RTU) queue which corresponds to the second pool. A second block in the second pool is also erased and transferred from the second pool to a first RTU queue which corresponds to the first pool. The blocks in the first pool are configured in single-level cell (SLC) mode, while the blocks in the second pool are configured in multi-bit-per-cell mode.

A computer program product, according to another embodiment, includes a computer readable storage medium having program instructions embodied therewith. The program instructions are readable and/or executable by a processor to cause the processor to: perform the foregoing method.

A system, according to yet another embodiment, includes: a plurality of non-volatile random access memory (NVRAM) blocks configured to store data. In some approaches, the system also includes a processor and logic integrated with and/or executable by the processor. The logic is configured to: perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a system diagram, in accordance with one embodiment.

FIG. 4 is a conceptual diagram which includes a block-stripe and page-stripe, in accordance with one embodiment.

DETAILED DESCRIPTION

Figure 1:
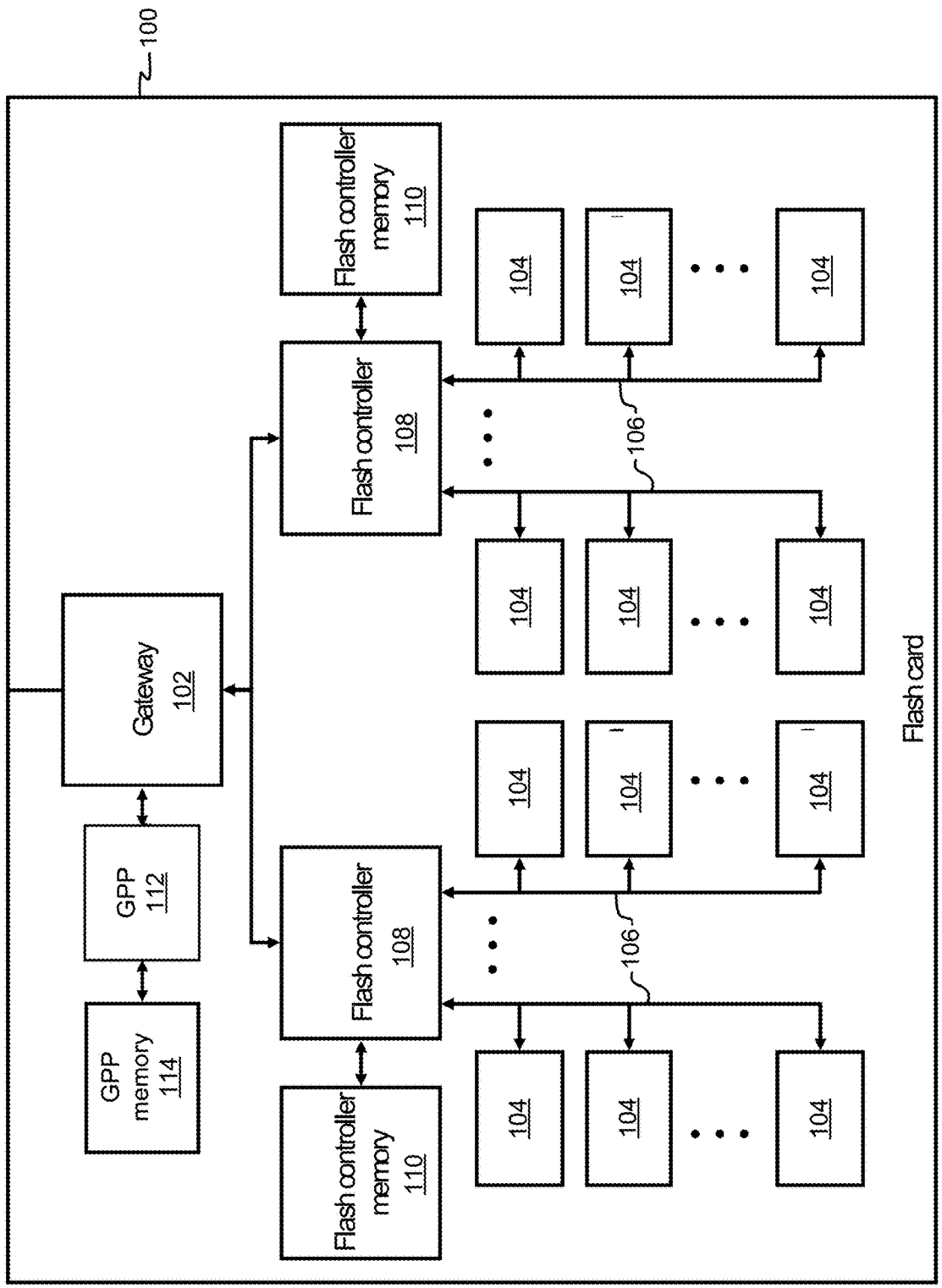
FIG. 1 is a diagram of a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the"

include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof. It should be appreciated that various embodiments herein can be implemented with a wide range of memory mediums, including for example non-volatile random access memory (NVRAM) technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a computer-implemented method is used to toggle block modes in a storage system. The computer-implemented method includes: maintaining a block switching metric for each block of memory in the storage system. A determination is made as to whether a first block in a first pool should be transferred to a second pool according to a block switching metric which corresponds to the first block. In response to determining that the first block in the first pool should be transferred to the second pool according to the block switching metric which corresponds to the first block, the first block is erased. The first block is then transferred from the first pool to a second ready-to-use (RTU) queue which corresponds to the second pool. A second block in the second pool is also erased and transferred from the second pool to a first RTU queue which corresponds to the first pool. The blocks in the first pool are configured in single-level cell (SLC) mode, while the blocks in the second pool are configured in multi-bit-per-cell mode.

In another general embodiment, a computer program product includes a computer readable storage medium having program instructions embodied therewith. The program instructions are readable and/or executable by a processor to cause the processor to: perform the foregoing method.

In yet another general embodiment, a system includes: a plurality of non-volatile random access memory (NVRAM) blocks configured to store data. In some approaches, the system also includes a processor and logic integrated with and/or executable by the processor. The logic is configured to: perform the foregoing method.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to a GPP memory 114 (which may comprise RAM, ROM, battery-backed DRAM, phase-change memory PC-RAM, MRAM, STT-MRAM, etc., or a combination thereof), and a number of memory controllers 108, which include Flash controllers in the present example. Each memory controller 108 is connected to a plurality of NVRAM memory modules 104 (which may comprise NAND Flash or other non-volatile memory type(s) such as those listed above) via channels 106.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
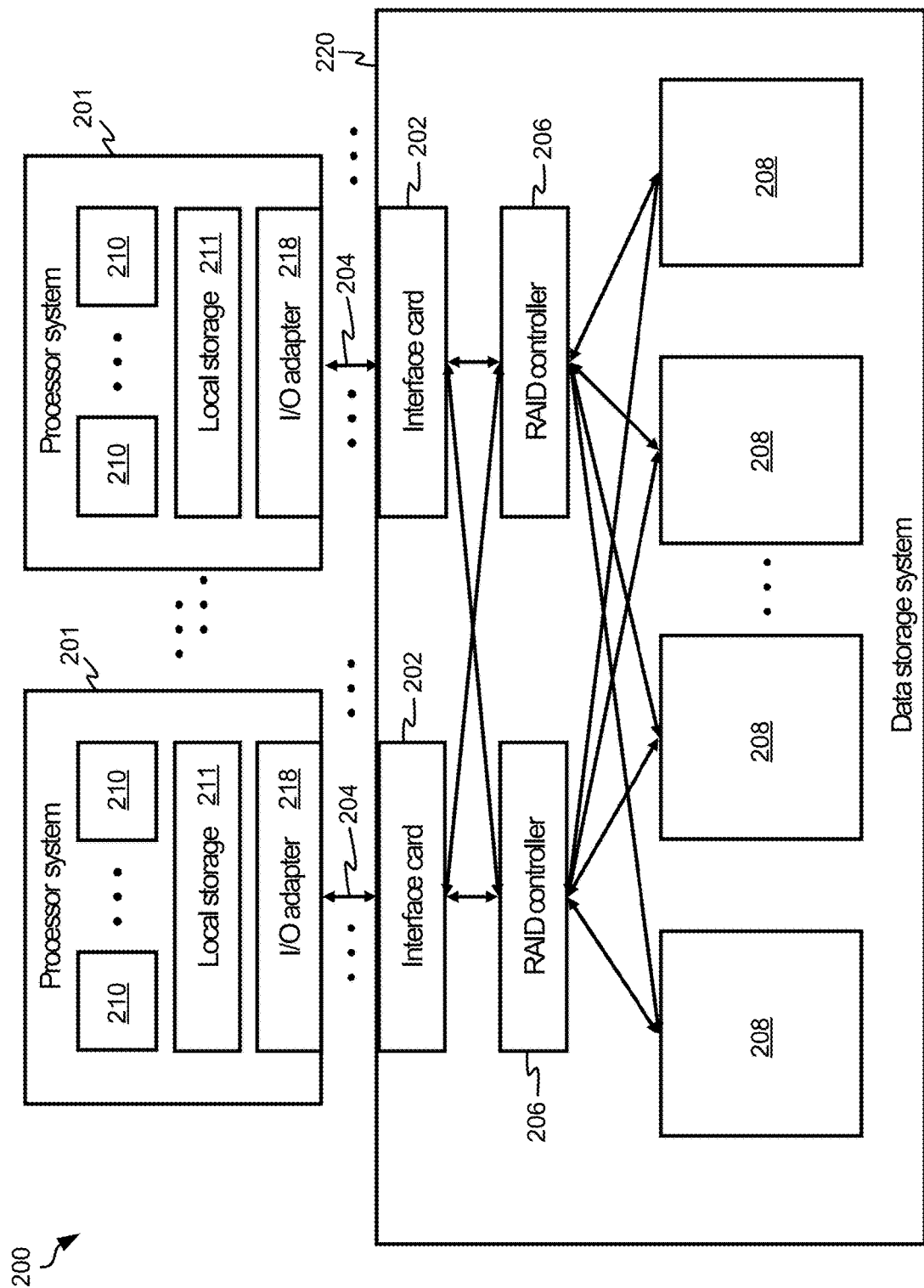
FIG. 2 is a diagram of a data storage system architecture, in accordance with one embodiment.

As previously mentioned, memory card 100 may be implemented in various types of data storage systems, depending on the desired embodiment. FIG. 2 illustrates a data storage system architecture 200 according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 914 of FIG. 9, ROM 916 of FIG. 9, etc.), and an I/O adapter 218 configured to communicate with the data storage system 220.

Referring again to FIG. 1, memory controllers 108, GPP 112 and/or other controllers described herein (e.g., RAID controllers 206 of FIG. 2) may be able to perform various functions on stored data, depending on the desired embodiment. Specifically, memory controllers or GPP 112 may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, logical erase blocks (LEBs) may be identified for being reclaimed and/or relocated. Typically, one LEB corresponds to one block stripe, but alternative implementations may consider a fixed number of block stripes or a single block building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity information is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary embodiment, which is in no way intended to limit the invention, memory controllers (e.g., see 108 and/or GPP 112 of FIG. 1) may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing write heat separation.

Write Heat Separation

In the present context, the "write heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

Tracking the write heat of a logical page may involve, for instance, allocating a certain number of bits in the LPT mapping entry for the page to keep track of how many write operations the page has seen in a certain time period or window. Typically, host write operations increase the write heat whereas internal relocation writes decrease the write heat. The actual increments and/or decrements to the write heat may be deterministic or probabilistic.

Similarly, read heat may be tracked with a certain number of additional bits in the LPT for each logical page. To reduce meta-data, read heat can also be tracked at a physical block level where separate counters per block for straddling and non-straddling reads can be maintained. However, it should be noted that the number of read requests to and/or read operations performed on a memory block may not come into play for write heat separation when determining the write heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar write heat values, write heat separation may be achieved. In particular, heat segregating methods may group hot memory pages together in certain memory blocks while cold memory pages are grouped together in separate memory blocks. Thus, a heat segregated LEB tends to be occupied by either hot or cold data.

The merit of write heat separation is two-fold. First, performing a garbage collection process on a hot memory block will prevent triggering the relocation of cold data as well. In the absence of write heat separation, updates to hot data, which are performed frequently, also results in the undesirable relocations of all cold data collocated on the same LEB as the hot data being relocated. Therefore, the write amplification incurred by performing garbage collection is much lower for embodiments implementing write heat separation.

Secondly, the relative heat of data can be utilized for wear leveling purposes. For example, hot data may be placed in healthier (e.g., younger) memory blocks, while cold data may be placed on less healthy (e.g., older) memory blocks relative to those healthier memory blocks. Thus, the rate at which relatively older blocks are exposed to wear is effectively slowed, thereby improving the overall endurance of a given data storage system implementing heat separation.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened by associating one or more erased blocks to the LEB.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

Referring now to FIG. 3, a system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free LEB units by relocating valid data and providing non-volatile memory blocks to be erased for later reuse. Thus, the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4KiB or 16KiB logical addresses. The memory I/O unit 310 communicates with the memory chips in order to perform low level operations, e.g., such as reading one or more non-volatile memory pages, writing a non-volatile memory page, erasing a non-volatile memory block, etc.

To better understand the distinction between block-stripes and page-stripes as used herein, FIG. 4 is a conceptual diagram 400, in accordance with one embodiment. LEBs are built from block stripes and typically a single block stripe is used to build a LEB. However, alternative embodiments may use multiple block stripes to form an LEB. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. Thus, the exemplary non-volatile memory controller conceptual diagram 400 of FIG. 4 may be implemented in a cache architecture. However, depending on the desired embodiment, the conceptual diagram 400 of FIG. 4 may be implemented in defining the organization of data stored in non-volatile memory. Accordingly, both implementations are described in turn below.

Non-Volatile Memory

Looking now to FIG. 4, the conceptual diagram 400 includes a set of M+1 aggregated planes labeled "Plane 0" through "Plane M". An aggregated plane consists of all physical planes with the same plane index on different channels. It should be noted that aggregated planes are also referred to herein simply as planes.

When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel may form a respective block-stripe. It follows that a number of block-stripes supported by a given embodiment of non-volatile memory may be determined by the number of blocks per plane and the number of planes.

In the exploded view of Plane 0, the conceptual diagram 400 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

Cache Architecture

Referring still to FIG. 4, each block of pages illustrated in the exploded view of aggregated Plane 0 may constitute a unique block from one channel when implemented in a cache architecture. Similarly, each channel contributes a single, individual block which form a block-stripe. For example, looking to conceptual diagram 400, Block 10 from Channel 0 includes all pages (Page 0 through Page N) therein, while Block 41 from Channel 4 corresponds to all pages therein, and so on.

In the context of a memory controller, e.g., which may be capable of implementing RAID at the channel level, a block-stripe is made up of multiple blocks which amount to a stripe of blocks. Looking still to FIG. 4, the multiple blocks of aggregated Plane 0 constitute Block-stripe 0. While all blocks in a block-stripe typically belong to the same aggregated plane, in some embodiments one or more blocks of a block-stripe may belong to different physical planes. It follows that each aggregated plane may include one or more block-stripe. Thus, according to an illustrative embodiment, Block 0 through Block 10 from different physical planes may constitute a block-stripe.

Regardless of whether the conceptual diagram 400 of FIG. 4 is implemented with non-volatile memory and/or a cache architecture, in different embodiments, the number of pages in each block and/or the number of channels in each plane may vary depending on the desired embodiment. According to an exemplary embodiment, which is in no way intended to limit the invention, a block may include 256 pages, but could include more or less in various embodiments. Analogously, the number of channels per plane and/or the number of planes may vary depending on the desired embodiment.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

As alluded to above, physical configurations of memory blocks in non-volatile memory have changed over time. For instance, in the past Flash blocks had a single-bit-per-cell configuration, but improvements in data storage have introduced Flash blocks that implement multi-bit-per-cell configurations. While blocks having multi-bit-per-cell configurations are able to store more information than blocks having a single-bit-per-cell configuration, this increase in storage capacity comes at a price in terms of performance latency. For example, memory blocks having a single-bit-per-cell configuration experience write latencies that are from about 2.5 times to about 10 times lower than experienced by memory blocks having multi-bit-per-cell configurations. Similarly, memory blocks having a single-bit-per-cell configuration experience lower read latencies than memory blocks having multi-bit-per-cell configurations.

This tradeoff between storage capacity and performance latency allows for storage systems to tailor the performance capabilities of memory to some extent. For instance, a storage system predicted to have a high amount of I/O traffic or program/erase (P/E) cycles is able to selectively include a greater number of memory blocks having a single-bit-per-cell configuration than those having multi-bit-per-cell configurations. Conversely, a storage system predicted to store a large amount of cold data is able to selectively include a greater number of memory blocks having multi-bit-per-cell configurations than those having a single-bit-per-cell configuration. However, blocks of non-volatile memory degrade with use over time, eventually becoming error prone and ultimately unusable. As a result, conventional storage systems implementing a static assignment of memory blocks to different pools have been unable to perform wear leveling and/or maintain efficient memory performance.

In sharp contrast to these shortcomings experienced by conventional systems, various ones of the embodiments included herein implement hybrid controllers which are able to dynamically toggle between different block configurations as well as adapt block pool sizes based on utilization and workload properties, e.g., as will be described in further detail below.

Figure 5:
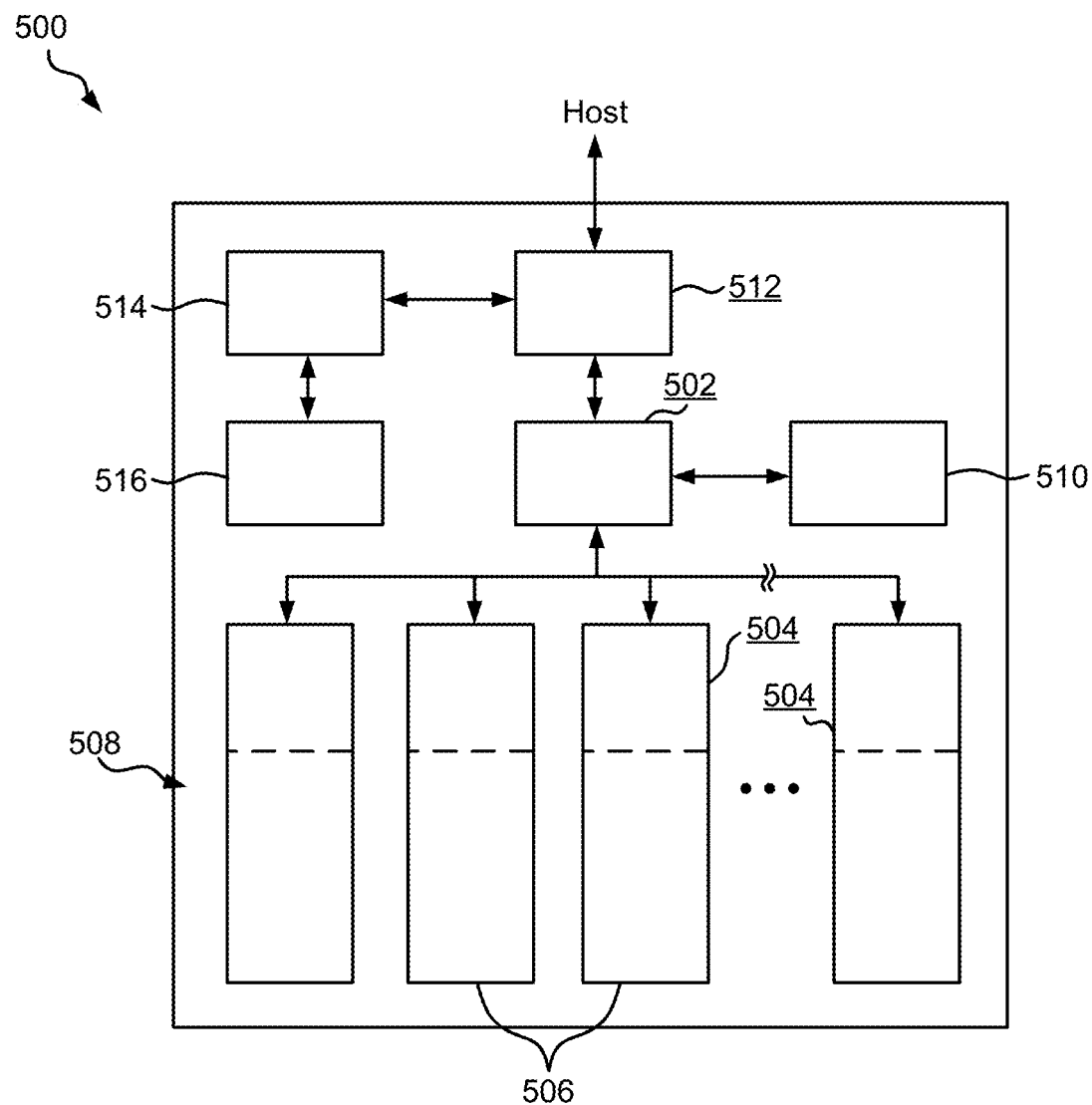
FIG. 5 is a partial representational view of a non-volatile memory module, in accordance with one embodiment.

Looking now to FIG. 5, a non-volatile memory module 500 having a hybrid controller 502 is illustrated in accordance with one embodiment. As an option, the present memory module 500 may be implemented in conjunction with features from any other embodiment listed herein, such as those described with reference to the other FIGS. However, such memory module 500 and others presented herein may be used in various applications and/or in permutations which may or may not be specifically described in the illustrative embodiments listed herein. Further, the memory module 500 presented herein may be used in any desired environment. Thus FIG. 5 (and the other FIGS.) may be deemed to include any possible permutation.

As noted above, the memory module 500 includes a hybrid controller 502 which is capable of managing and/or adapting blocks which are configured in single-bit-per-cell mode (also referred to herein as "single-level cell mode", or "SLC mode") as well as multi-bit-per-cell mode. According to some approaches, the hybrid controller 502 manages the different block configurations by splitting them into two different pools 504, 506. One of these pools 504 is designated as including those blocks which are configured in SLC mode, while the other pool 506 includes the blocks configured in multi-bit-per-cell mode.

Each of the pools 504, 506 extend across a number of data storage components (e.g., NVRAM memory modules such as NAND flash memory devices) which together serve as a memory array 508. It follows that the various components illustrated in FIG. 5 function as a memory card and may implement any of the approaches described above with respect to memory card 100 of FIG. 1. Referring still to FIG. 5, the hybrid controller 502 is also coupled to a cache memory 510 as well as a gateway 512 which receives data commands from one or more hosts, storage systems, running applications, etc. The gateway 512 is in turn coupled to a GPP 514 and GPP memory 516. As mentioned above, the GPP 514 may be of any desired type, e.g., such as an ASIC, FPGA, CPU, etc. Similarly, the GPP memory 516 may be of any desired type, e.g., such as RAM, ROM, battery-backed DRAM, phase-change memory PC-RAM, MRAM, STT-MRAM, etc., and/or combinations thereof.

The hybrid controller 502 may store data that is frequently accessed (e.g., read, rewritten, appended to, etc.) in blocks that are configured in SLC mode and therefore included in the first pool 504, while data that is accessed less frequently is stored in blocks that are configured in multi-bit-per-cell mode and therefore included in the second pool 506. This storage scheme achieves an efficient use of the different blocks of memory and their respective performance characteristics. However, as memory blocks in each of the pools 504, 506 experience different amounts of wear as well as different numbers of P/E cycles over time, the effective health of each block diverges from the others. Even though wear of different blocks increases differently with increasing P/E cycles, for the same P/E cycles, the wear experienced in multi-bit-cells increases faster than that experienced in SLC cells on average. Moreover, as the ratio of hot and cold data stored in the memory module 500 fluctuates over time, each of the respective pools 504, 506 may be underutilized and/or overutilized.

Accordingly, the hybrid controller 502 is able to selectively reconfigure any of the blocks in the first and/or second pools 504, 506 to dynamically adapt the memory based on actual utilization and/or workload properties. This allows for the memory module 500 to regulate the effective health of each of the memory blocks, e.g., by performing wear leveling. Efficient performance of the overall module 500 is also maintained irrespective of the amount of hot or cold data stored therein.

Figure 6:
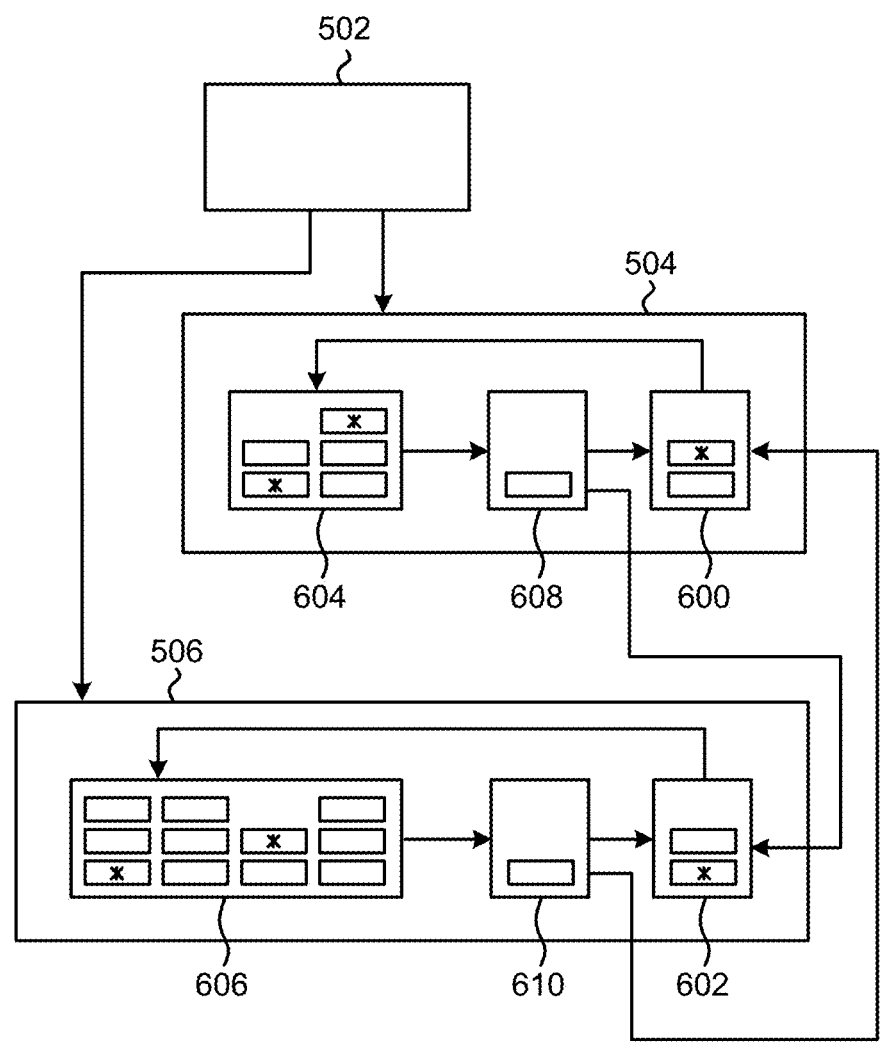
FIG. 6 is a partial representational view of a data and block flow overview, in accordance with one embodiment.

FIG. 6 provides a detailed view of the first and second pools 504, 506 in FIG. 5 and therefore various components of FIG. 6 have common numbering with those of FIG. 5. As shown, the first and second pools 504, 506 each receive write operations from the hybrid controller 502. Data in the write operations received by each of the first and second pools 504, 506 is used to fill blocks of memory which have accumulated in the first and second ready-to-use (RTU) queues 600, 602. As blocks in the first and second RTU queues 600, 602 are filled, they are returned to the respective occupied block pools 604, 606 where they remain until they are identified as being ready to undergo a garbage collection procedure.

Upon reaching a low level of erased blocks in one of the RTU queues 600, 602, the garbage collector selects a block from the corresponding occupied block pools 604, 606 which has a high number of invalidated pages. As noted above, data included in blocks of memory is invalidated over time as a result of write updates, deletion operations, etc. Once invalidated, the data in a given block of memory is effectively useless and may be deleted. However, selected portions of data cannot be deleted from a block of non-volatile memory while maintaining the remainder of the data in the block. Rather, valid data is first relocated before the whole block is erased. It follows that as the amount of invalidated data in a given block of memory increases, the block becomes an increasingly inefficient use of storage space, thereby increasing the incentive to perform a garbage collection operation on the block. Inversely, performing a garbage collection operation on a block of memory which has a low amount of invalidated data therein is an inefficient use of computing resources and actually decreases efficiency. This tradeoff between computing resource utilization and storage space reclamation may thereby be balanced as desired. The garbage collector then relocates all still valid data to new locations before the block is identified as ready to erase.

Blocks identified as ready to erase are transitioned to a ready to erase queue 608, 610 in each of the first and second pools 504, 506, respectively. After entering the ready to erase queues 608, 610, a block is eventually erased and returned to the respective RTU queue 600, 602. Blocks of memory may also be transitioned between the first and second pools 504, 506. However, it should be noted that erase operations are performed slightly differently for blocks configured in SLC mode compared to blocks that are configured in multi-bit-per-cell mode. Therefore, the target mode (e.g., the mode a given block is intended to be configured in) for a block is preferably specified when the block is being erased. This results in blocks being able to move from ready to erase queue 610 to RTU queue 602 or 600, and similarly move from ready to erase queue 608 to RTU queue 600 or 602, e.g., as indicated by the different arrowed lines in FIG. 6.

According to the present description, a block that is "transferred" between pools remains in a same plane and channel of memory. In other words, while the functional characteristics of the given block may change as a result of activating and/or deactivating certain bits in each of the cells therein, the blocks themselves do not physically move in the memory. Rather, the blocks are "transferred" between pools in a logical sense. The erase operation may involve specifying the target mode of the block. In some approaches these transfers are indicated in an LPT, an operations log, a block status table, etc.

Certain blocks may be identified as being eligible for transfer between the first and second pools 504, 506. According to some approaches, this eligibility may be based on a number of P/E cycles the block has experienced since a last transfer between the pools, whether the block is ready to be erased, one or more credits which are associated to the pools or channels of each pool and correspond to the number of blocks that may be transferred in each direction among the pools, etc., e.g., as will be described in further detail below.

Figure 7:
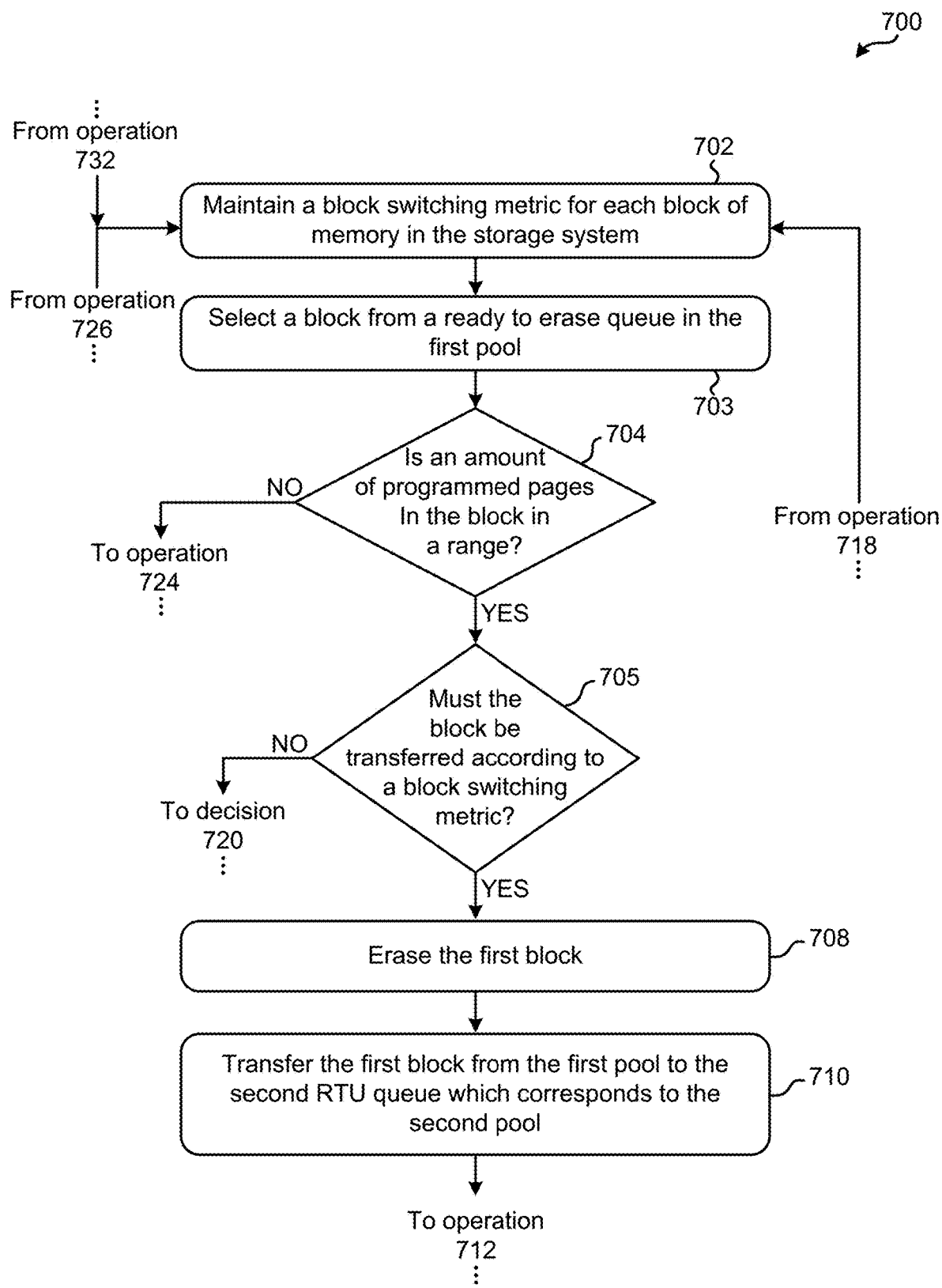
FIG. 7 is a flowchart of a method, in accordance with one embodiment.
Figure 7:
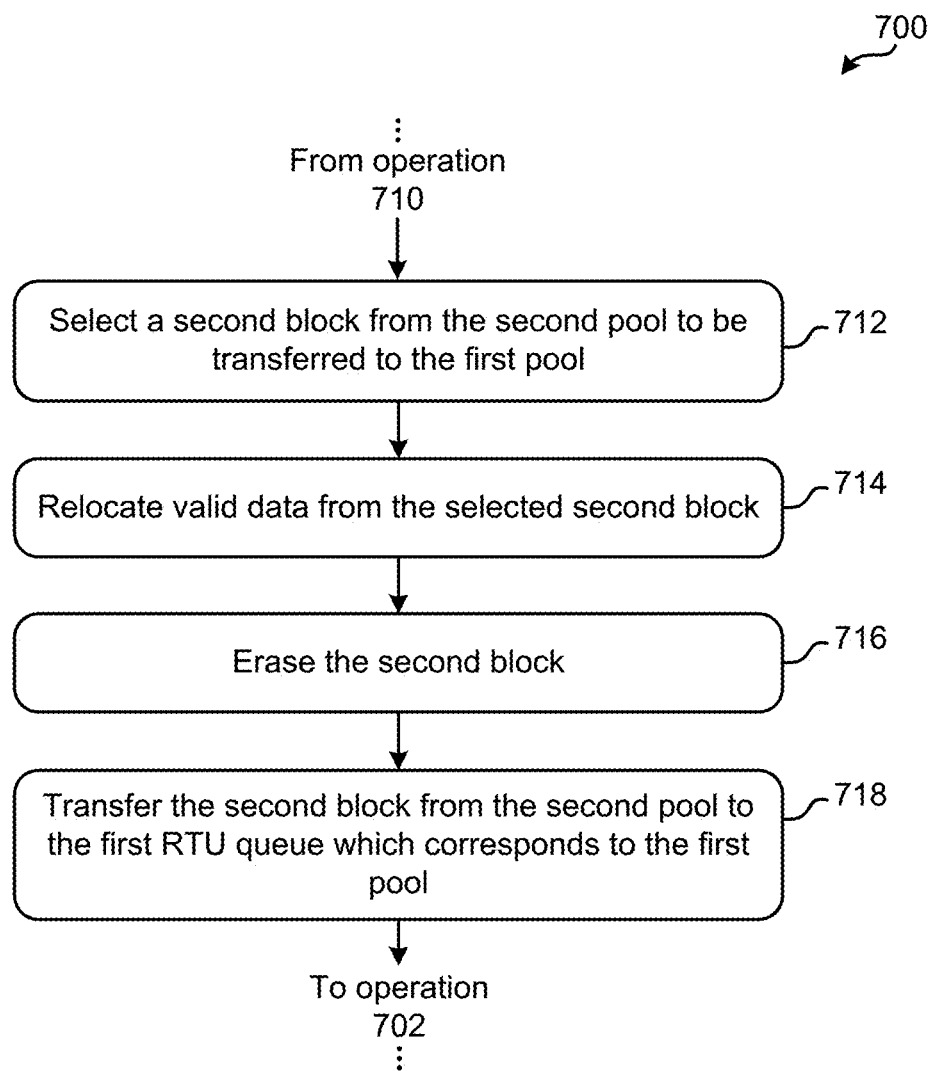
Figure 7:
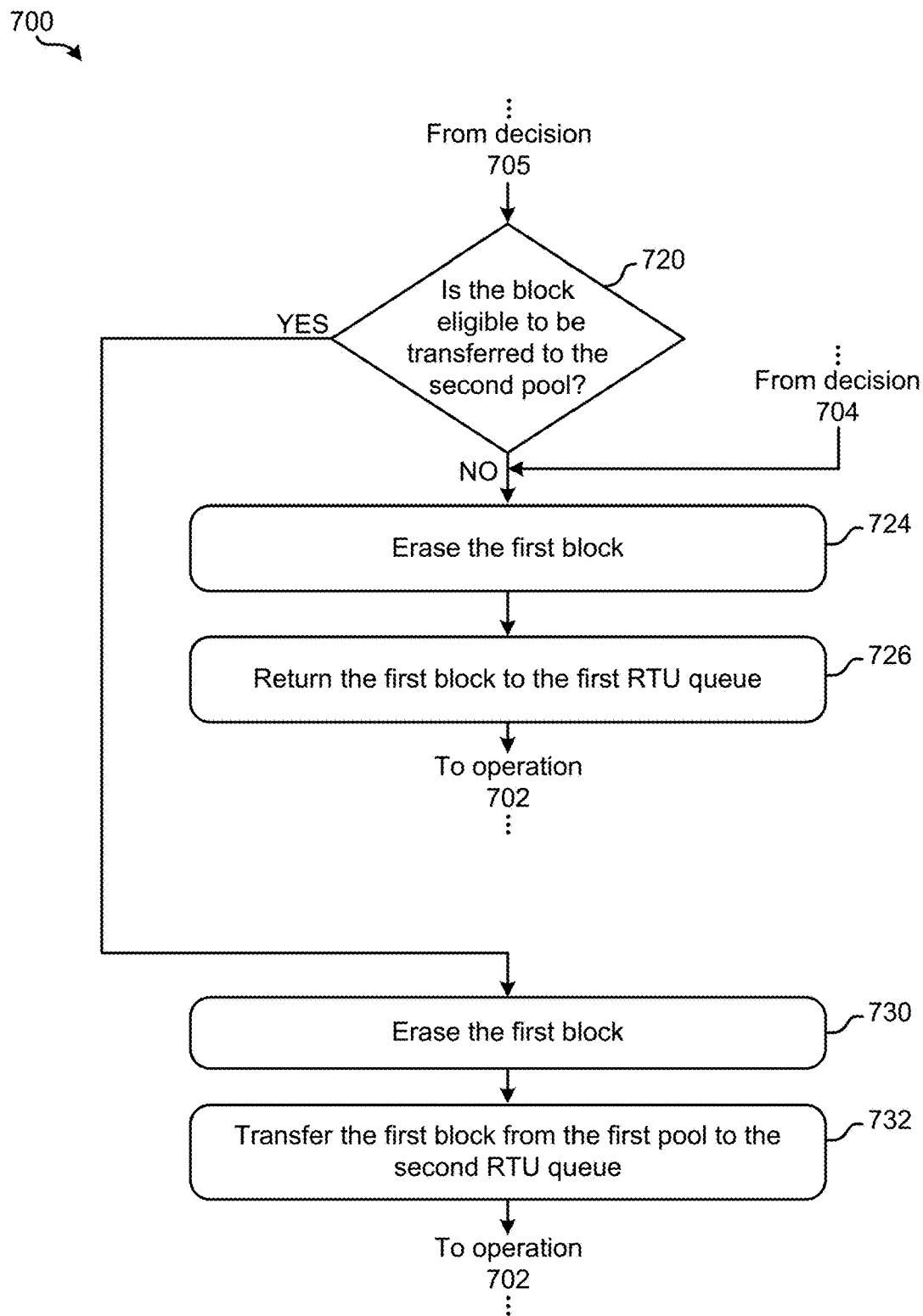

Looking now to FIG. 7, a method 700 for toggling block modes in a storage system is shown according to one embodiment. The method 700 may be performed in accordance with the present invention in any of the environments depicted in FIGS. 1-6, among others, in various embodiments. Of course, more or less operations than those specifically described in FIG. 7 may be included in method 700, as would be understood by one of skill in the art upon reading the present descriptions. For instance, the various processes included in method 700 are described below in the context of evaluating memory blocks in a first pool which are configured in SLC mode. However, any one or more of the various processes included in method 700 may be applied in the context of evaluating memory blocks in a second pool which are configured in multi-bit-per-cell mode, e.g., as will be described in further detail below.

Each of the steps of the method 700 may be performed by any suitable component of the operating environment. For example, in various embodiments, the method 700 may be partially or entirely performed by a hybrid controller, a controller, a processor, a computer, etc., or some other device having one or more processors therein. Thus, in some embodiments, method 700 may be a computer-implemented method. In such embodiments, the computer used to implement the method may include a memory module itself or a portion thereof, e.g., such as the hybrid controller. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, operation 702 of method 700 includes maintaining a block switching metric for each block of memory in the storage system. The block switching metric is used in some approaches to determine whether a given block of memory may and/or should (e.g., "must") be reconfigured and switched to the other pool. It follows that the block switching metric maintained for a given block is preferably capable of tracking the amount of use the given block has experienced. It should be noted that in some approaches, block switching metrics are only maintained for blocks that have a predetermined number of programmed pages included therein. For example, block switching metrics are maintained for blocks for which at least half of the pages therein have been programmed before the block switch operation is initiated.

Depending on the approach, different types of block switching metrics may be maintained for each of the blocks of memory. For instance, in some approaches the block switching metric includes a P/E cycle count for the respective block. Moreover, the P/E cycle count may be specific to a certain configuration for the respective block. For instance, the P/E cycle count may only track the number of P/E cycles that have been experienced by the respective block while configured in multi-bit-per-cell mode or SLC mode. However, endurance of blocks configured in multi-bit-cell mode is generally lower than endurance of blocks configured in SLC mode, and therefore it is advantageous to track P/E cycles in multi-bit-mode if tracked in only one mode. Moreover, in a preferred embodiment, the P/E cycle count in the switching metrics may be reset when switching the block mode such that only the P/E cycles in the current mode since the last switch are used. This desirably reduces the amount of metadata stored for each block of memory, thereby increasing the efficiency of the overall system. This P/E cycle count may be used to extrapolate the P/E cycle count for the respective block while configured in other modes, e.g., as would be appreciated by one skilled in the art after reading the present description.

In other approaches, the block switching metrics includes a raw bit error rate (RBER) for the respective block. The RBER may further be maintained as an average value for all pages in the given block, the highest (e.g., worst) value of any of the pages or codewords in the given block, the median value of all pages in the given block, etc. A block switching metric based on the RBER of a block preferably reflects the contributions to the RBER from permanent changes in the underlying threshold voltage distributions from program-erase cycling. In still further approaches, the block switching metrics includes a data access times for the respective block, e.g., such as read performance times, write performance times, erase times, etc. Combinations of different block switching metrics may even be implemented in some approaches. Although not depicted in FIG. 7, method 700 may also include initializing one or more credits which correspond to the number of blocks that can be transferred in each direction among the pools. With respect to the present description, a "credit" is used in some approaches to ensure that the memory pools remain relatively equal in terms of their respective size, e.g., as will be described in further detail below.

The method 700 proceeds with operation 703 where a block is selected to be erased from the ready to erase queue 608 in the first pool before proceeding to decision 704. In an alternative embodiment operation 703 may also select a block from the occupied block pool 606. However, as all still valid data must be relocated prior to erasing the block, it is advantageous to select a block from the ready to erase queue 608. Decision 704 includes determining whether an amount of programmed pages in the first block is in a predetermined range. Some approaches specify that at least half of the pages are to be programmed in order to change the mode of the block while others may not have such a restriction.

In response to determining that the amount of programmed pages in the first block is not in the predetermined range, method 700 proceeds with operation 724 which is described below. However, in response to determining that the amount of programmed pages in the first block is sufficient and hence in the predetermined range, method 700 proceeds to decision 705. There, decision 705 includes determining whether a first block in a first pool must be transferred to a second pool according to the block switching metric which corresponds to the first block. As mentioned above, blocks of memory may be divided into two different pools, where each pool includes blocks of memory that are configured in the same mode. For instance, the blocks in the first pool are configured in SLC mode while the blocks in the second pool are configured in multi-bit-per-cell mode (e.g., see pools 504, 506 of FIG. 5 above). However, the number of pools and the types of block configurations included therein may vary depending on the desired approach.

It should also be noted that "the first block" is in no way intended to be limited to a specific block of memory. Rather, the term "first block" has been used to reference any one of the blocks in the first pool which is currently being evaluated by method 700. Method 700 inspects blocks in the ready to erase queues (e.g., see 608, 610), but in an alternative approach, method 700 may also inspect all blocks of memory in each pool in a sweeping fashion and therefore decision 705 and/or any of the other processes included herein may be repeated in an iterative fashion. Clearly, any block selected by method 700 that is currently in the occupied block pool (e.g., see 606, 604) preferably has all valid data therein relocated first by a garbage collection procedure before erasing the block, e.g., as would be appreciated by one skilled in the art after reading the present description.

Again, the block switching metric which corresponds to the first block is used to determine whether the first block must be transferred to the second pool. Accordingly, in some approaches decision 705 includes determining whether the block switching metric is in a predetermined range. Different types of block switching metrics may be maintained for each pool or each of the blocks of memory and therefore the process of determining whether the first block should be transferred to the second pool may vary depending on what type of metric is available. For instance, in some approaches the block switching metric includes a P/E cycle count for the first block which may be used to determine if the first block has experienced a predetermined number of P/E cycles since being switched to the current mode or globally (i.e., P/E cycles in either mode). In other approaches, a RBER value reflecting permanent changes in the underlying threshold voltage distributions from program-erase cycling and/or data access times associated with the first block may be used to determine whether the first block is performing undesirably. It follows that the use of thresholds is a desirable way of implementing the block switching metrics, as the thresholds in each mode can be different. The thresholds may also be dynamically adapted based on workload properties (e.g., when pools are being resized).

In response to determining that the first block must be transferred to the second pool according to the block switching metric corresponding thereto, method 700 proceeds to operation 708 which includes erasing the first block.

Method 700 further includes transferring the first block from the first pool to the second RTU queue which corresponds to the second pool. See operation 710. According to the present description, a block that is "transferred" between RTU queues and/or pools remains in a same plane and channel of memory (e.g., see FIG. 4). In other words, while the functional characteristics of the given block may change as a result of activating and/or deactivating certain bits in each of the cells therein, the blocks themselves do not physically move in the memory. Rather, the blocks are "transferred" between RTU queues and/or pools in a logical sense. In some approaches these transfers are indicated in an LPT, an operations log, etc.

Again, the first pool (along with the first RTU queue) includes memory blocks configured in SLC mode while the second pool (along with the second RTU queue) includes memory blocks configured in multi-bit-per-cell mode according to the present embodiment. Depending on the approach, the blocks in the second pool that are configured in multi-bit-per-cell mode may have a number of different configurations. For instance, in some approaches the blocks in the second pool that are configured in multi-bit-per-cell mode are configured in multi-level cell (MLC) mode, while in other approaches the blocks in the second pool that are configured in multi-bit-per-cell mode are configured in triple-level cell (TLC) mode. In still other approaches, the blocks in the second pool that are configured in multi-bit-per-cell mode are configured in quad-level cell (QLC) mode, and each of the blocks configured in QLC mode include lower pages, upper pages, extra pages, and top pages.

Therefore, because each of the first and second pools include memory blocks which are configured in different modes, the process of actually transferring the first block in operation 710 involves reconfiguring the block. Depending on whether the selected block is being transferred from the first pool to the second RTU queue or the second pool to the first RTU queue, the process of reconfiguring the block of memory may be performed differently. For instance, blocks being transferred from the first pool to the second RTU queue are preferably reconfigured from SLC mode to multi-bit-per-cell mode. However, blocks which are being transferred from the second pool to the first RTU queue are preferably reconfigured from multi-bit-per-cell mode to SLC mode. The process of reconfiguring a given block between SLC and multi-bit-per-cell mode may be performed by deactivating and/or reactivating certain ones of the bits included in the block, logically redefining the given block, etc., or using any processes which would be apparent to one skilled in the art after reading the present description.

Blocks are able to be reconfigured in a different mode in response to experiencing changes in the capacity used and/or changes in the workload properties experienced (e.g., skew changes). However, some approaches may not track workload properties. Moreover, when utilization and workload properties remain unchanged, but there are still write operations being performed (e.g., host and/or relocation writes), swapping blocks between pools is performed.

Normally, recalibrating a block of memory has an effect on the performance of the block itself. For instance, the read threshold voltage shift values associated with accessing the given block may change in some situations as a result of the recalibration thereof. However, because method 700 causes memory blocks to be reconfigured periodically over time independent of utilization and workload properties, previous read threshold voltage shift values that compensate changes in the underlying threshold voltage distributions from P/E cycling (i.e., read threshold voltages shift values from base calibrations) are often accurate and may be reused in such situations. These previous read threshold voltage shift values may be stored in memory (e.g., a lookup table) and accessed as needed, thereby decoupling base calibration from the block mode toggling process. Moreover, the processes included herein do not rely on write heat separation. This desirably reduces performance delays and conserves computing power, thereby increasing efficiency of the system. However, in some situations a new threshold voltage shift value may be recalibrated for a given block using any processes which would be apparent to one skilled in the art after reading the present description. Further, the periodically swapping of blocks between the pools is advantageous for wear leveling. Performing wear leveling within a pool only, reduces the overall endurance to be dictated by the pool that wears out first. Periodical swapping of blocks allows for performing wear leveling such as health binning in each of the pools independently while the wear between the pools is equalized through the periodical block swapping at the same time such that overall endurance is enhanced to the average endurance of all blocks.

From operation 710, method 700 proceeds to operation 712 which includes selecting a second block from the second pool to be transferred to the first pool. Again, it is preferred that the first and second pools maintain their respective sizes over time (e.g., when the utilization and workload properties do not change or change only marginally). Transferring the second block to the first pool thereby ensures that the second pool does not increase in size as well as ensuring that the first pool does not decrease in size.

Typically, the selected first block was previously eligible to be transferred to the second pool according to the block switching metric in the past but there were not enough credits to transfer the block from the first to the second pool as will be further explained below. The method 700 as shown in FIG. 7 assumes that the credits did not change in the meantime, hence a second block is selected from the second pool in operation 712. However, in an alternative embodiment, the credits may have been replenished in the meantime (e.g., as a result of another block being moved from the second to the first pool in the meantime or the necessity to shrink the first pool and enlarge the second pool due to changes in the utilization and/or workload properties) as would be appreciated by one skilled in the art upon reading the present description. Consequently, method 700 may decrement a counter corresponding to the switching direction, incrementing a counter corresponding to the opposite switching direction, and directly return (not shown in FIG. 7) to operation 702 (i.e., skipping operations 712, 714, 716, and 718 in this case).

The block selected in operation 712 may be any of the blocks in the second pool. However, in some approaches a block from the ready to erase queue 610 is selected. In other approaches a block with the highest ongoing P/E cycle count is selected to be transferred to the first pool. In yet other approaches, the block identified as having the highest health metric is selected to be transferred to the first pool. In still other approaches, certain blocks that are marked (e.g., flagged) to indicate that they should be transferred to the other pool may be selected from in operation 712.

Operation 714 includes relocating valid data from the selected second block when the selected second block is from the occupied block pool 606 and not from the ready to erase queue 610, e.g., according to any of the approaches included herein. If the second selected block is from the ready to erase queue 610, all valid data has already been relocated and operation 714 is skipped. Relocating the valid data from a block may be performed in any desired manner depending on the approach. For instance, the valid data may be temporarily stored in a cache (e.g., see cache memory 510 in FIG. 5) before being stored in a different block of memory in some approaches. In other approaches, the valid data may be transferred to another block of memory directly.

Referring still to FIG. 7, operation 716 includes erasing the second block. Furthermore, operation 718 includes actually transferring the second block from the second pool to the first RTU queue which corresponds to the first pool.

While this process of transferring blocks between the first and second pools is performed such that swapping the first and second blocks is performed substantially at the same time, the process of balancing the size of the first and second pools may be somewhat delayed in other approaches. For instance, it may be desirable to limit the number of concurrent block switches that occur in normal operation of the system. It may thereby make sense to allow only a limited number of blocks to be switched in each direction between the pools at any point in time using a credit-based scheme.

For instance, this credit-based scheme may involve maintaining two counters, each of which corresponds to the number of blocks which can be transferred between the pools in one of the directions (e.g., first to second pool and second to first pool). Initially, n1 and n2 blocks may be switched in each direction, where the values of n1 and n2 may be equal or different. According to an example, which is in no way intended to limit the invention, [n1, n2]=[1, 0], [1, 1], [5,5], etc. According to some approaches, blocks may only be transferred between pools if the counter for the corresponding direction is non-zero. In the situation that a counter is non-zero, the counter is preferably decremented after a block is transferred between the pools in the corresponding direction, while the counter which corresponds to the other direction is incremented. In some approaches, one or both of the counters may be saturating counters. However, in other approaches the pools may even be resized by intentionally not transferring a second block in response to the first block being transferred. The pools may thereby be adjusted in size as desired.

Referring still to FIG. 7, method 700 returns to operation 702 from operation 718, e.g., such that the block switching metrics may be updated and/or continue to be monitored. It follows that method 700 is able to successfully regulate the wear of various blocks in memory while also maintaining block pool sizes in real time, thereby ensuring memory longevity and efficient performance and of the overarching storage system.

However, returning to decision 705, method 700 advances to decision 720 in response to determining that the first block in the first pool does not have to be transferred to the second pool according to the block switching metric corresponding thereto. In other words, method 700 advances to decision 720 in response to determining that the block switching metric does not indicate that it is critical that the given block is transferred to the other pool. There, decision 720 includes determining whether the first block is eligible to be transferred to the second pool.

As previously mentioned, as the amount of invalidated data in a given block of memory increases, the block becomes an increasingly inefficient use of storage space, thereby increasing the incentive to perform a garbage collection operation on the block. Inversely, performing a garbage collection operation on a block of memory which has a low amount of invalidated data therein is an inefficient use of computing resources and actually decreases inefficiency. This tradeoff between computing resource utilization and storage space reclamation may thereby be implemented in performing decision 720.

Therefore, in preferred approaches decision 720 is determined according to the block switching metric corresponding to the first block as well as according to a saturating counter which corresponds to the switching direction. In other words, as the selected block is preferably from the ready to erase queue and the number of blocks in the ready to erase queue is typically low compared to the total number of blocks in the pool, there is a high chance that the selected block is not yet eligible according to the block switching metric while other blocks may already be eligible. As garbage collection is performed in the background, at some point selected blocks will eventually reach a block switching metric that makes them eligible for being reconfigured. The block switching metric that indicates that the block may be reconfigured and switched to the other pool is reached before the block switching metrics indicate that the block must be reconfigured. Hence, the probability that a block switches mode before it must be switched exist and is relatively high, thereby reducing the probability to perform a forced swapping which may result in operation 712 selecting a second block from the occupied block pool that involves additional overhead to relocate still valid data. For example, decision 720 may involve block switching metrics that determining whether the P/E cycle count since being switched to the current mode is in a predetermined range and/or the RBER for the given block is in a predetermined range which signifies that the block may be transferred if desired, but it is not critical in terms of wear leveling that the transfer occurs.

Decision 720 may also incorporate one or more credits which correspond to the amount of blocks that can be transferred between the pools in determining whether the block is eligible to be transferred to the second pool. In other words, the credits and corresponding counters correspond to a specific direction in which the block configuration modes are switched. For example, saturating counters may be assigned to each of the blocks for keeping track of how many times the given block has been transferred from one pool to the other. Again, in some approaches a block may only be transferred between pools if the counter for the intended transfer direction is non-zero. In the situation that a counter is non-zero, the counter is preferably decremented after a block is transferred between the pools in the given direction, while the counter which corresponds to the other direction is incremented.

In response to determining the first block is not eligible to be transferred to the second pool according to the block switching metric which corresponds thereto, method 700 proceeds to operation 724 which includes erasing the first block, while operation 726 includes returning the first block to the first RTU queue. From operation 726, method 700 returns to operation 702 as depicted, e.g., such that the block switching metrics may be updated and/or continue to be monitored.

However, in response to determining that the first block is eligible to be transferred to the second pool according to the block switching metric which corresponds thereto, method 700 proceeds to operation 730 which includes erasing the first block. Operation 732 further includes transferring the first block from the first pool to the second RTU queue according to any of the approaches described herein. For approaches implementing counters for each switching direction, a counter which corresponds to the switching direction from the first to the second pool may also be decremented, and a counter which corresponds to the opposite switching direction may be incremented, in response to finally transferring the first block from the first pool to the second RTU queue. From operation 732, method returns to operation 702.

As previously mentioned, one or more of the various processes included in method 700 may be applied in the context of evaluating memory blocks in a second pool which are configured in multi-bit-per-cell mode, and potentially transitioning one or more of them to being configured in SLC mode. Accordingly, any one or more of the processes included in method 700 and/or any of the approaches described in conjunction therewith, may be implemented in the context of evaluating blocks of memory included in the second pool and determining whether they should be transferred to the first pool. In other words, the processes included in method 700 may be used to monitor any block of memory in a storage system, e.g., as would be appreciated by one skilled in the art after reading the present description.

According to an example, which is in no way intended to limit the invention, the processes included in method 700 may be used to determining whether a block in the second pool must be transferred to the first pool according to a block switching metric which corresponds to the given block. In response to determining that the block in the second pool must be transferred to the first pool according to the block switching metric which corresponds thereto, valid data is relocated from the block if the block is not from the ready to erase queue before the block is erased. The block is further transferred from the second pool to the first RTU queue. A second block in the first pool is also selected to replace the block transferred from the second pool. Valid data in the selected second block is relocated if any before the selected second block is erased and transferred from the first pool to the second RTU queue. Further, the processes included in method 700 may be used to determining whether a block in the second pool is eligible to be transferred to the first pool according to a block switching metric which corresponds to the given block. In response to determining that the block in the second pool is eligible to be transferred to the first pool according to the block switching metric which corresponds thereto, valid data is relocated from the block if the block is not from the ready to erase queue before the block is erased. The block is further transferred from the second pool to the first RTU queue.

It follows that the various approaches described herein are able to use characterizations to determine the average block endurance for blocks which are configured in different modes. The average block endurance in each mode can also be used to determine a target ratio of P/E cycles the blocks are intended to experience in each mode. For example, a ratio of 1:9 P/E cycles in each mode may be set as a target, as blocks in SLC mode typically have nine times the endurance of blocks in QLC mode on average. Simple thresholds are also used to control toggling between the different block modes as well as reduce the block-mode switching frequency and/or the associated computing overhead. For instance, a first threshold may be used to indicate when a given block becomes eligible for switching, while a second threshold may be used to determine when a given block must be switched. As a result, the blocks of memory are switched between pools frequently enough to reduce variance of block wear between the pools, and combined with wear leveling, to reduce variance of block wear among all blocks, enable threshold voltage shift value updates in either mode, and accurate health tracking of the block. Health binning and/or write-stream mapping may further be implemented with any of the approaches included herein, e.g., in order to further improve wear leveling performance.

It should be noted that although various ones of the approaches have been described herein in the context of two memory block pools, any of these approaches may be extended to embodiments having more than two block pools. In such embodiments, the target pool can be determined using priorities, based on user input, by comparing the RTU block levels of each respective pool and selecting the pool that has the lowest number of RTU blocks, etc. It should also be noted that terms like "in a range" and "above a threshold" are in no way intended to limit the invention. Rather than determining whether a value is in a given range or above a given threshold, equivalent determinations may be made, e.g., as to whether a value is outside a predetermined range, whether an absolute value is above a threshold, whether a value is below a threshold, etc., depending on the desired approach.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 8:
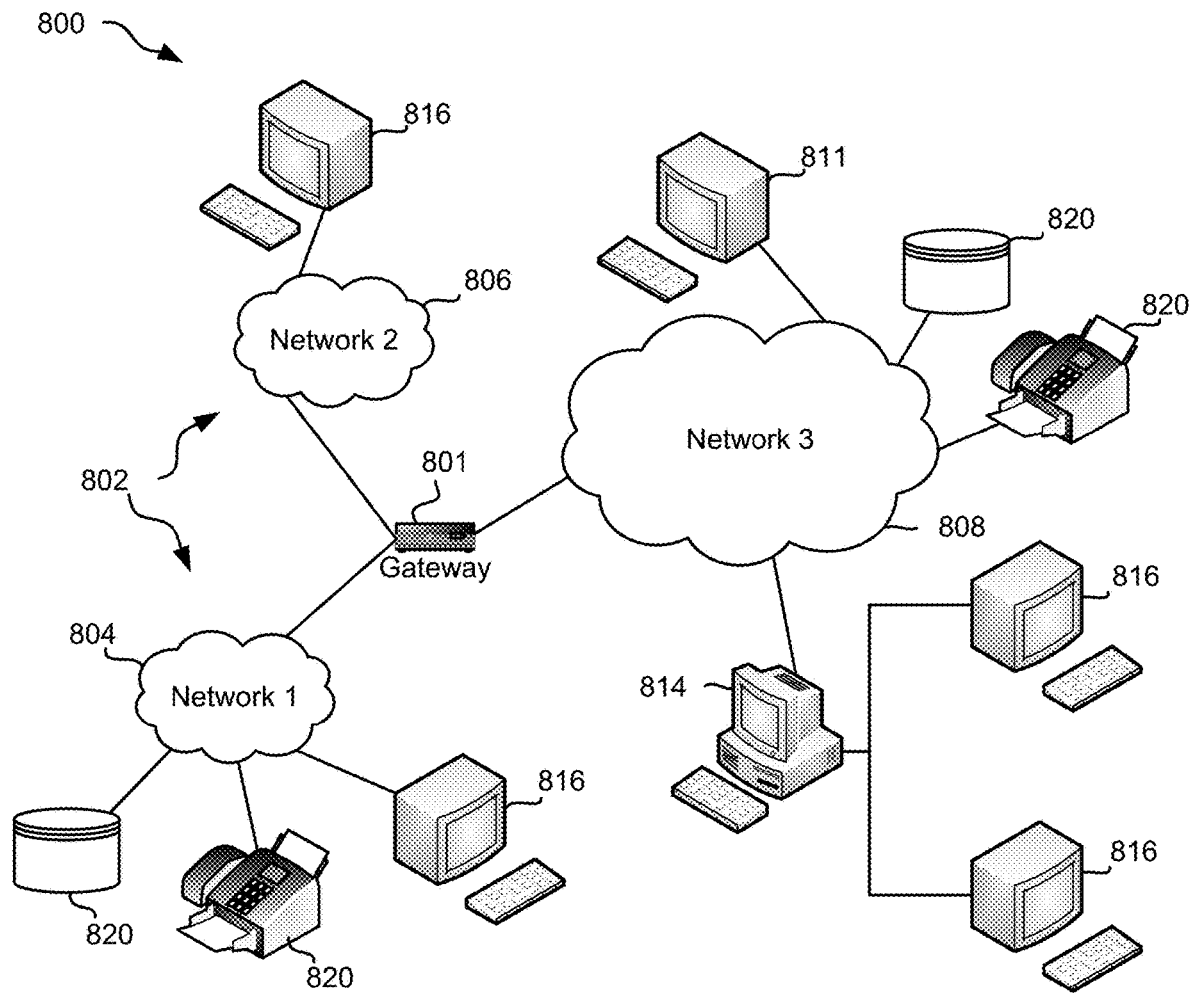
FIG. 8 is a network architecture, in accordance with one embodiment.

FIG. 8 illustrates a network architecture 800, in accordance with one embodiment. As shown in FIG. 8, a plurality of remote networks 802 are provided including a first remote network 804 and a second remote network 806. A gateway 801 may be coupled between the remote networks 802 and a proximate network 808. In the context of the present network architecture 800, the networks 804, 806 may each take any form including, but not limited to a LAN, a WAN such as the Internet, public switched telephone network (PSTN), internal telephone network, etc.

In use, the gateway 801 serves as an entrance point from the remote networks 802 to the proximate network 808. As such, the gateway 801 may function as a router, which is capable of directing a given packet of data that arrives at the gateway 801, and a switch, which furnishes the actual path in and out of the gateway 801 for a given packet.

Further included is at least one data server 814 coupled to the proximate network 808, and which is accessible from the remote networks 802 via the gateway 801. It should be noted that the data server(s) 814 may include any type of computing device/groupware. Coupled to each data server 814 is a plurality of user devices 816. Such user devices 816 may include a desktop computer, laptop computer, handheld computer, printer, and/or any other type of logic-containing device. It should be noted that a user device 811 may also be directly coupled to any of the networks, in some embodiments.

A peripheral 820 or series of peripherals 820, e.g., facsimile machines, printers, scanners, hard disk drives, networked and/or local data storage units or systems, etc., may be coupled to one or more of the networks 804, 806, 808. It should be noted that databases and/or additional components may be utilized with, or integrated into, any type of network element coupled to the networks 804, 806, 808. In the context of the present description, a network element may refer to any component of a network.

According to some embodiments, methods and systems described herein may be implemented with and/or on virtual systems and/or systems which emulate one or more other systems, such as a UNIX system which virtually hosts a MICROSOFT WINDOWS environment, etc. This virtualization and/or emulation may be enhanced through the use of VMWARE software, in some embodiments.

In other embodiments, one or more networks 804, 806, 808, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 9:
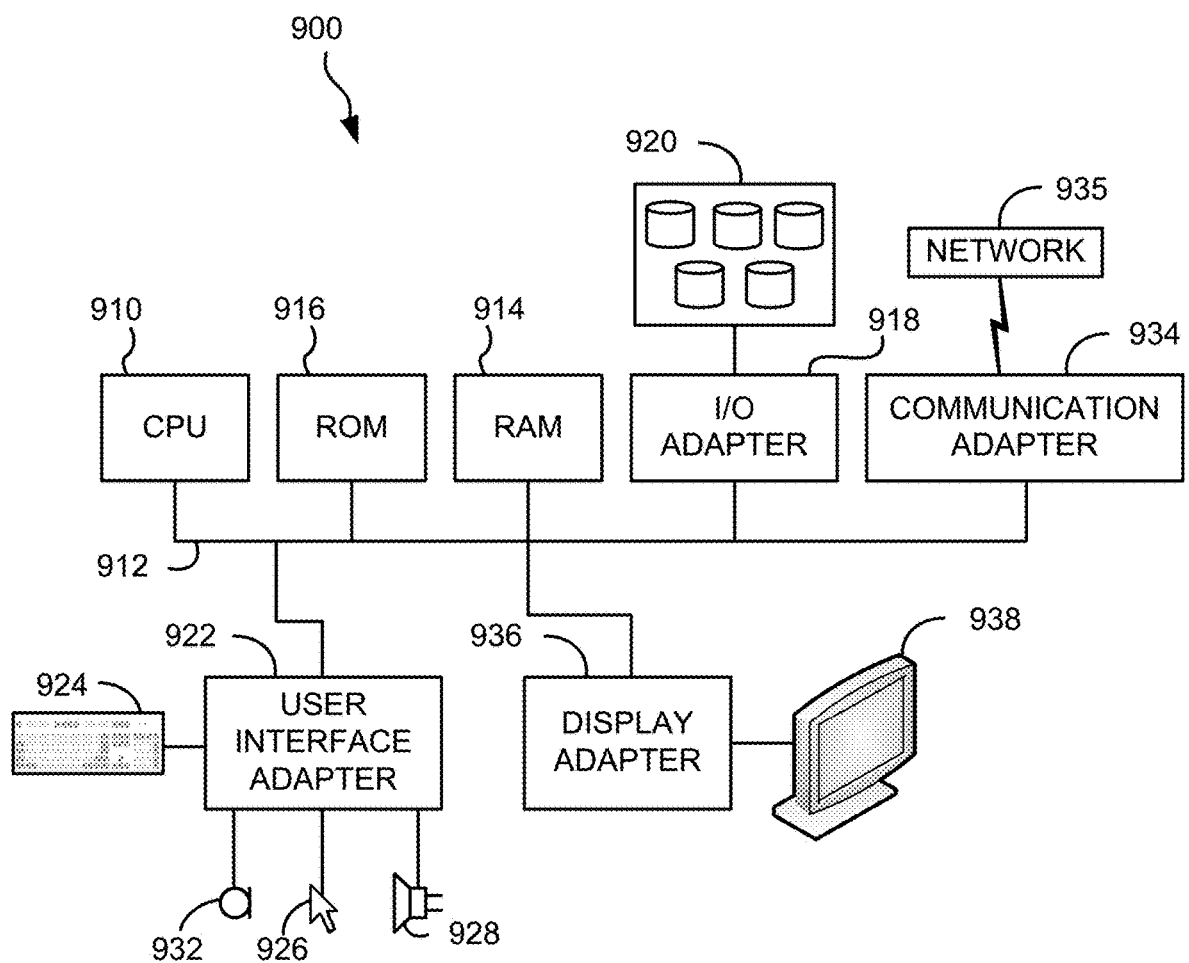
FIG. 9 is a representative hardware environment that may be associated with the servers and/or clients of FIG. 8, in accordance with one embodiment.

FIG. 9 shows a representative hardware environment associated with a user device 816 and/or server 814 of FIG. 8, in accordance with one embodiment. FIG. 9 illustrates a typical hardware configuration of a processor system 900 having a central processing unit 910, such as a microprocessor, and a number of other units interconnected via a system bus 912, according to one embodiment. In some embodiments, central processing unit 910 may include any of the approaches described above with reference to the one or more processors 210 of FIG. 2.

The processor system 900 shown in FIG. 9 includes a Random Access Memory (RAM) 914, Read Only Memory (ROM) 916, and an I/O adapter 918. According to some embodiments, which are in no way intended to limit the invention, I/O adapter 918 may include any of the approaches described above with reference to I/O adapter 218 of FIG. 2. Referring still to processor system 900 of FIG. 9, the aforementioned components 914, 916, 918 may be used for connecting peripheral devices such as storage subsystem 920 to the bus 912. In some embodiments, storage subsystem 920 may include a similar and/or the same configuration as data storage system 220 of FIG. 2. According to an example, which is in no way intended to limit the invention, storage subsystem 920 may include non-volatile data storage cards, e.g., having NVRAM memory cards, RAM, ROM, and/or some other known type of non-volatile memory, in addition to RAID controllers as illustrated in FIG. 2.

With continued reference to FIG. 9, a user interface adapter 922 for connecting a keyboard 924, a mouse 926, a speaker 928, a microphone 932, and/or other user interface devices such as a touch screen, a digital camera (not shown), etc., to the bus 912.

Processor system 900 further includes a communication adapter 934 which connects the processor system 900 to a communication network 935 (e.g., a data processing network) and a display adapter 936 which connects the bus 912 to a display device 938.

The processor system 900 may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 10:
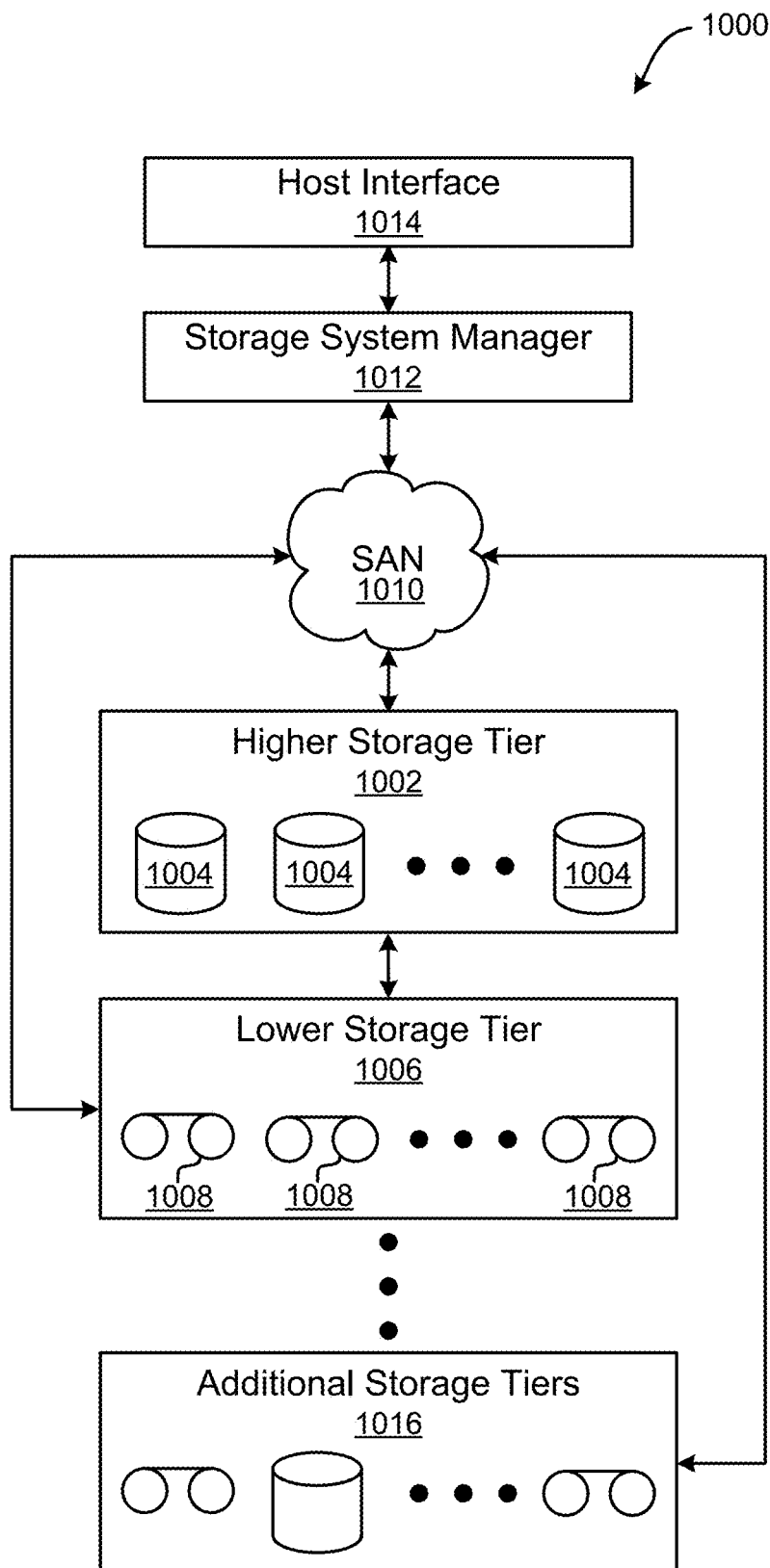
FIG. 10 is a tiered data storage system in accordance with one embodiment.

Moreover, FIG. 10 illustrates a storage system 1000 which implements high level (e.g., SSD) storage tiers in combination with lower level (e.g., magnetic tape) storage tiers, according to one embodiment. Note that some of the elements shown in FIG. 10 may be implemented as hardware and/or software, according to various embodiments. The storage system 1000 may include a storage system manager 1012 for communicating with a plurality of media on at least one higher storage tier 1002 and at least one lower storage tier 1006. However, in other approaches, a storage system manager 1012 may communicate with a plurality of media on at least one higher storage tier 1002, but no lower storage tier. The higher storage tier(s) 1002 preferably may include one or more random access and/or direct access media 1004, such as hard disks, nonvolatile memory (NVM), NVRAM), solid state memory in SSDs, flash memory, SSD arrays, flash memory arrays, etc., and/or others noted herein or known in the art. According to illustrative examples, FIGS. 3-4 show exemplary architectures of SSD systems which may be used as a higher storage tier 1002 depending on the desired embodiment.

Referring still to FIG. 10, the lower storage tier(s) 1006 preferably includes one or more lower performing storage media 1008, including sequential access media such as magnetic tape in tape drives and/or optical media, slower accessing HDDs, slower accessing SSDs, etc., and/or others noted herein or known in the art. One or more additional storage tiers 1016 may include any combination of storage memory media as desired by a designer of the system 1000. Thus, the one or more additional storage tiers 1016 may, in some approaches, include a SSD system architecture similar or the same as those illustrated in FIGS. 1-2. Also, any of the higher storage tiers 1002 and/or the lower storage tiers 1006 may include any combination of storage devices and/or storage media.

The storage system manager 1012 may communicate with the storage media 1004, 1008 on the higher storage tier(s) 1002 and lower storage tier(s) 1006 through a network 1010, such as a storage area network (SAN), as shown in FIG. 10, or some other suitable network type. The storage system manager 1012 may also communicate with one or more host systems (not shown) through a host interface 1014, which may or may not be a part of the storage system manager 1012. The storage system manager 1012 and/or any other component of the storage system 1000 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 1000 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 1002, may include a majority of SSD storage media for storing data in a higher performing storage environment, and remaining storage tiers, including lower storage tier 1006 and additional storage tiers 1016 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 1002, while data not having one of these attributes may be stored to the additional storage tiers 1016, including lower storage tier 1006. Of course, one of skill in the art, upon reading the present descriptions, may devise many other combinations of storage media types to implement into different storage schemes, according to the embodiments presented herein.

According to some embodiments, the storage system (such as 1000) may include logic configured to receive a request to open a data set, logic configured to determine if the requested data set is stored to a lower storage tier 1006 of a tiered data storage system 1000 in multiple associated portions, logic configured to move each associated portion of the requested data set to a higher storage tier 1002 of the tiered data storage system 1000, and logic configured to assemble the requested data set on the higher storage tier 1002 of the tiered data storage system 1000 from the associated portions.

Of course, this logic may be implemented as a method on any device and/or system or as a computer program product, according to various embodiments.

It will be clear that the various features of the foregoing systems and/or methodologies may be combined in any way, creating a plurality of combinations from the descriptions presented above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for toggling block modes in a storage system, comprising:
    maintaining a block switching metric for each block of memory in the storage system;
    determining whether a first block in a first pool should be transferred to a second pool according to a block switching metric which corresponds to the first block;
    in response to determining that the first block in the first pool should be transferred to the second pool according to the block switching metric which corresponds to the first block, erasing the first block;
    transferring the first block from the first pool to a second ready-to-use (RTU) queue which corresponds to the second pool;
    erasing a second block; and
    transferring the second block from the second pool to a first RTU queue which corresponds to the first pool,
    wherein the blocks in the first pool are configured in single-level cell (SLC) mode,
    wherein the blocks in the second pool are configured in multi-bit-per-cell mode.

2. The computer-implemented method of claim 1, wherein the block switching metric includes information selected from the group consisting of: a program/erase (P/E) cycle count for the respective block, the P/E cycle count for the respective block in the current mode since the last switching of the block, a raw bit error rate (RBER) for the respective block, and a data access time for the respective block.

3. The computer-implemented method of claim 2, wherein the block switching metric includes the P/E cycle count for the respective block in the current mode since the last switch of the block mode.

4. The computer-implemented method of claim 1, wherein the block switching metric only includes a P/E cycle count for the respective block while configured in multi-bit-per-cell mode.

5. The computer-implemented method of claim 1, wherein transferring the first block from the first pool to the second RTU queue includes: reconfiguring the first block from SLC mode to multi-bit-per-cell mode.

6. The computer-implemented method of claim 5, wherein transferring the second block from the second pool to the first RTU queue includes: reconfiguring the second block from multi-bit-per-cell mode to SLC mode.

7. The computer-implemented method of claim 1, comprising:
    determining whether an amount of programmed pages in the first block is in a predetermined range; and
    in response to determining that the amount of programmed pages in the first block is in the predetermined range, determining whether the first block in the first pool should be transferred to the second pool according to the block switching metric which corresponds to the first block.

8. The computer-implemented method of claim 1, comprising:
    in response to determining that the first block in the first pool does not have to be transferred to the second pool according to the block switching metric which corresponds to the first block, determining whether the first block is eligible to be transferred to the second pool according to the block switching metric corresponding to the first block and according to a saturating counter which corresponds to the switching direction;
    in response to determining that the first block is eligible to be transferred to the second pool according to the block switching metric corresponding to the first block and the saturating counter which corresponds to the switching direction, erasing the first block;
    transferring the first block from the first pool to the second RTU queue; and
    decrementing the saturating counter which corresponds to the switching direction.

9. The computer-implemented method of claim 8, comprising:
    in response to determining that the first block is not eligible to be transferred to the second pool according to the block switching metric corresponding to the first block and the saturating counter which corresponds to the first block, erasing the first block; and
    placing the first block in the first RTU queue.

10. The computer-implemented method of claim 1, wherein the blocks in the second pool that are configured in multi-bit-per-cell mode are configured in quad-level cell (QLC) mode.

11. The computer-implemented method of claim 1, comprising:
    determining whether a third block in the second pool should be transferred to the first pool according to a block switching metric which corresponds to the third block;
    in response to determining that the third block in the second pool should be transferred to the first pool according to a block switching metric which corresponds to the third block, erasing the third block;

transferring the third block from the second pool to the first RTU queue which corresponds to the first pool;
erasing a fourth block; and
transferring the fourth block from the first pool to the second RTU queue which corresponds to the second pool.

12. The computer-implemented method of claim 11, wherein transferring the third block from the second pool to the first RTU queue includes: reconfiguring the third block from multi-bit-per-cell mode to SLC mode, wherein transferring the fourth block from the first pool to the second RTU queue includes: reconfiguring the fourth block from SLC mode to multi-bit-per-cell mode.

13. A computer program product comprising a computer readable storage medium having program instructions embodied therewith, the program instructions readable and/or executable by a processor to cause the processor to:
   maintain, by the processor, a block switching metric for each block of memory in a storage system;
   determine, by the processor, whether a first block in a first pool should be transferred to a second pool according to a block switching metric which corresponds to the first block;
   in response to determining that the first block in the first pool should be transferred to the second pool according to the block switching metric which corresponds to the first block, erase, by the processor, the first block;
   transfer, by the processor, the first block from the first pool to a second ready-to-use (RTU) queue which corresponds to the second pool;
   erase, by the processor, a second block; and
   transfer, by the processor, the second block from the second pool to a first RTU queue which corresponds to the first pool,
   wherein the blocks in the first pool are configured in single-level cell (SLC) mode,
   wherein the blocks in the second pool are configured in multi-bit-per-cell mode.

14. The computer program product of claim 13, the program instructions readable and/or executable by the processor to cause the processor to:
   in response to determining that the first block in the first pool does not have to be transferred to the second pool according to the block switching metric which corresponds to the first block, determine, by the processor, whether the first block is eligible to be transferred to the second pool according to the block switching metric corresponding to the first block and according to a saturating counter which corresponds to the switching direction;
   in response to determining that the first block is eligible to be transferred to the second pool according to the block switching metric corresponding to the first block and the saturating counter which corresponds to the switching direction, erase, by the processor, the first block;
   transfer, by the processor, the first block from the first pool to the second RTU queue; and
   decrement, by the processor, the saturating counter which corresponds to the switching direction.

15. The computer program product of claim 13, the program instructions readable and/or executable by the processor to cause the processor to:
   determine, by the processor, whether a third block in the second pool should be transferred to the first pool according to a block switching metric which corresponds to the third block;
   in response to determining that the third block in the second pool should be transferred to the first pool according to a block switching metric which corresponds to the third block, erase, by the processor, the third block;
   transfer, by the processor, the third block from the second pool to the first RTU queue which corresponds to the first pool;
   erase, by the processor, a fourth block; and
   transfer, by the processor, the fourth block from the first pool to the second RTU queue which corresponds to the second pool.

16. The computer program product of claim 15, wherein transferring the third block from the second pool to the first RTU queue includes: reconfiguring the third block from multi-bit-per-cell mode to SLC mode, wherein transferring the fourth block from the first pool to the second RTU queue includes: reconfiguring the fourth block from SLC mode to multi-bit-per-cell mode.

17. A system, comprising:
   a plurality of non-volatile random access memory (NVRAM) blocks configured to store data; and
   a processor and logic integrated with and/or executable by the processor, the logic being configured to:
      maintain, by the processor, a block switching metric for each block of memory in a storage system;
      determine, by the processor, whether a first block in a first pool should be transferred to a second pool according to a block switching metric which corresponds to the first block;
      in response to determining that the first block in the first pool should be transferred to the second pool according to the block switching metric which corresponds to the first block, erase, by the processor, the first block;
      transfer, by the processor, the erased first block from the first pool to a second ready-to-use (RTU) queue which corresponds to the second pool;
      erase, by the processor, a second block in the second pool; and
      transfer, by the processor, the erased second block from the second pool to a first RTU queue which corresponds to the first pool,
      wherein the blocks in the first pool are configured in single-level cell (SLC) mode,
      wherein the blocks in the second pool are configured in multi-bit-per-cell mode.

18. The system of claim 17, the logic being configured to:
   in response to determining that the first block in the first pool does not have to be transferred to the second pool according to the block switching metric which corresponds to the first block, determine, by the processor, whether the first block is eligible to be transferred to the second pool according to the block switching metric corresponding to the first block and a saturating counter which corresponds to the switching direction;
   in response to determining that the first block is eligible to be transferred to the second pool according to the block switching metric corresponding to the first block and the saturating counter which corresponds to the switching direction, erase, by the processor, the first block;
   transfer, by the processor, the first block from the first pool to the second RTU queue; and
   decrement, by the processor, the saturating counter which corresponds to the switching direction.

19. The system of claim 17, the logic being configured to:
determine, by the processor, whether a third block in the second pool should be transferred to the first pool according to a block switching metric which corresponds to the third block;
in response to determining that the third block in the second pool should be transferred to the first pool according to a block switching metric which corresponds to the third block, erase, by the processor, the third block;
transfer, by the processor, the third block from the second pool to the first RTU queue which corresponds to the first pool;
erase, by the processor, a fourth block; and
transfer, by the processor, the fourth block from the first pool to the second RTU queue which corresponds to the second pool.

20. The system of claim 19, wherein transferring the third block from the second pool to the first RTU queue includes: reconfiguring the third block from multi-bit-per-cell mode to SLC mode, wherein transferring the fourth block from the first pool to the second RTU queue includes: reconfiguring the fourth block from SLC mode to multi-bit-per-cell mode.

* * * * *